United States Patent
Kozarekar

(10) Patent No.: US 7,624,828 B2
(45) Date of Patent: Dec. 1, 2009

(54) VEHICLE POWER TRANSFER SYSTEM AND METHOD, AND VEHICLE USING THE SAME

(75) Inventor: Shailesh Kozarekar, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 454 days.

(21) Appl. No.: 11/381,562

(22) Filed: May 4, 2006

(65) Prior Publication Data
US 2007/0256869 A1    Nov. 8, 2007

(51) Int. Cl.
*B60K 1/00* (2006.01)

(52) U.S. Cl. .................. 180/65.6; 180/65.1; 180/65.51; 310/114; 310/115; 280/69; 280/72; 280/157

(58) Field of Classification Search ................ 180/65.1, 180/65.5, 65.6; 280/69, 72, 157; 903/906, 903/951; 310/114, 115
See application file for complete search history.

(56) References Cited

U.S. PATENT DOCUMENTS

| | | | |
|---|---|---|---|
| 4,180,138 A | | 12/1979 | Shea |
| 4,330,045 A | * | 5/1982 | Myers ..................... 180/65.51 |
| 4,799,564 A | * | 1/1989 | Iijima et al. .............. 180/65.51 |
| 5,116,291 A | * | 5/1992 | Toyosumi et al. ........... 475/178 |
| 5,343,970 A | | 9/1994 | Severinsky |
| 5,443,130 A | * | 8/1995 | Tanaka et al. .............. 180/65.6 |
| 5,525,851 A | * | 6/1996 | Kumamoto et al. ......... 310/114 |
| 5,532,535 A | * | 7/1996 | Oltmanns .................... 310/90 |
| 5,675,203 A | * | 10/1997 | Schulze et al. ............. 310/113 |
| 5,823,280 A | | 10/1998 | Lateu et al. |
| 5,845,732 A | * | 12/1998 | Taniguchi et al. .......... 180/65.6 |
| 5,941,790 A | * | 8/1999 | Steen et al. ................. 475/230 |
| 6,557,656 B2 | | 5/2003 | Haniu et al. |
| 6,695,736 B2 | | 2/2004 | Takenaka |
| 6,710,491 B2 | * | 3/2004 | Wu et al. ..................... 310/112 |
| 6,868,793 B2 | * | 3/2005 | Hoffman et al. ............ 105/136 |
| 6,977,454 B2 | * | 12/2005 | Hsu ........................... 310/171 |
| 7,030,526 B2 | * | 4/2006 | Tsukamoto et al. ........... 310/90 |
| 7,086,977 B2 | * | 8/2006 | Supina et al. .................. 475/5 |
| 7,247,117 B2 | * | 7/2007 | Forster ....................... 475/221 |
| 7,285,896 B1 | * | 10/2007 | Mallory ..................... 310/328 |
| 7,316,627 B2 | * | 1/2008 | Bennett ...................... 475/149 |
| 7,384,357 B2 | * | 6/2008 | Thomas et al. ................ 475/5 |
| 7,413,417 B2 | * | 8/2008 | Klaus et al. ................. 417/366 |
| 7,459,815 B2 | * | 12/2008 | Han et al. ..................... 310/77 |
| 2003/0205422 A1 | * | 11/2003 | Morrow et al. ............. 180/65.2 |
| 2004/0011578 A1 | * | 1/2004 | Hoffmann et al. ........... 180/218 |
| 2004/0050597 A1 | * | 3/2004 | Ai et al. ..................... 180/65.2 |
| 2004/0084233 A1 | | 5/2004 | Wakuta et al. |

(Continued)

FOREIGN PATENT DOCUMENTS

FR    2746352    9/1997

(Continued)

*Primary Examiner*—Paul N Dickson
*Assistant Examiner*—Jacob Meyer
(74) *Attorney, Agent, or Firm*—David B. Kelley; Brooks Kushman P.C.

(57) ABSTRACT

A vehicle power transfer system and method, and vehicle using the same. The vehicle power transfer system including a differential unit coupled to a half axle, and an electric motor for supplying torque to propel a vehicle. The electric motor is collinear with the differential unit and the half axle.

20 Claims, 3 Drawing Sheets

U.S. PATENT DOCUMENTS

| | | | |
|---|---|---|---|
| 2004/0084235 A1* | 5/2004 | Heinen | 180/65.5 |
| 2004/0097315 A1 | 5/2004 | Shimizu et al. | |
| 2005/0068007 A1 | 3/2005 | Prema et al. | |
| 2005/0140230 A1* | 6/2005 | Johnson et al. | 310/112 |
| 2005/0236198 A1* | 10/2005 | Jenkins | 180/65.5 |
| 2005/0282676 A1 | 12/2005 | Forster | |
| 2006/0028084 A1* | 2/2006 | Hsu | 310/171 |
| 2006/0043811 A1* | 3/2006 | Ong et al. | 310/156.08 |
| 2006/0046887 A1* | 3/2006 | Bennett | 475/150 |
| 2006/0052198 A1* | 3/2006 | Namuduri et al. | 475/5 |
| 2006/0213707 A1* | 9/2006 | Heinen | 180/65.5 |
| 2007/0267234 A1* | 11/2007 | Rogg | 180/65.5 |
| 2007/0273232 A1* | 11/2007 | Ong et al. | 310/156.01 |
| 2008/0011531 A1* | 1/2008 | Cole | 180/65.5 |
| 2008/0127757 A1* | 6/2008 | Eberlein et al. | 74/25 |
| 2008/0309174 A1* | 12/2008 | Jockel | 310/54 |

FOREIGN PATENT DOCUMENTS

| | | |
|---|---|---|
| JP | 60131319 | 7/1985 |
| WO | WO 9533630 A1 | 6/1995 |
| WO | WO 03035422 A1 | 5/2003 |
| WO | WO 2004022373 A1 | 3/2004 |
| WO | 2007077416 A1 | 7/2007 |

* cited by examiner

US 7,624,828 B2

VEHICLE POWER TRANSFER SYSTEM AND METHOD, AND VEHICLE USING THE SAME

BACKGROUND OF THE INVENTION

1. Field of the Invention

The present invention relates to a power transfer system and method for a vehicle, such as a hybrid vehicle, and a vehicle using the same.

2. Background Art

With reference to FIG. 1, a cross-sectional schematic diagram is provided of a conventional power transfer system 10 corresponding to a vehicle having an electric motor 40 configured to drive a plurality of wheels 36 (e.g., a hybrid electric vehicle, a pure electric vehicle and/or the like). As illustrated, the electric machine, or motor 40, may be used to output torque to a shaft (i.e., rotor shaft) 42 which, in turn, is connected to the plurality of vehicle drive wheels 36 through a gear set 38, a shaft 60, a differential unit 62, and a plurality of half axles 64. In general, the gear set 38 may be coupled to one or more other components (i.e., in addition to the motor 40) as represented generally by the shaft 34. The motor 40 is generally powered from an energy power source, such as a high voltage battery (not shown).

As further illustrated in FIG. 1, one or more bearing sets 80 (e.g., 80a and 80b) are generally implemented in connection with the power transfer system 10. In particular, the bearing sets 80a and 80b are generally implemented to center the rotor shaft 42 on a housing of the motor 40. Each of the bearing sets 80a and 80b have a grounded outer race, such as an outer race fixed to the housing. Accordingly, to avoid excessive wear and/or premature failure of the bearing sets 80a and 80b, each of the bearing sets 80a and 80b must be rated at the maximum rotational speed (i.e., max Ws) of the motor 40.

It may be desirable, therefore, to have a power transfer system and/or method wherein the rating of one or more bearing set (e.g., 80a and/or 80b) may be reduced. Such a reduction in the rating of one or more bearing set may decrease the cost of an associated power transfer system as the cost of manufacturing and/or obtaining bearings is generally proportional to the rating of the bearings.

SUMMARY OF THE INVENTION

According to the present invention, then, a vehicle power transfer system is provided. The system comprises a differential unit coupled to a half axle, and an electric motor for supplying torque to propel a vehicle. The electric motor is collinear with the differential unit and the half axle.

Also according to the present invention, a method for transferring power in a vehicle is provided. The method comprises providing an electric motor configured to generate torque, providing a differential unit coupled to a half axle, and aligning the electric motor collinear with the differential unit and the half axle.

Still further according to the present invention, a vehicle is provided. The vehicle comprises a differential unit coupled to a half axle, wherein the half axle is configured to couple to a wheel of the vehicle. The vehicle further comprises an electric motor aligned collinearly with the differential unit and the half axle. The motor includes a rotor shaft having a bore such that the rotor shaft has an inner and outer surface. The half axle passes through the bore such that the half axle is proximate the inner surface of the rotor shaft.

DETAILED DESCRIPTION

By way of example, a system and methodology for implementing the present invention is described below. The provided system and methodology may be adapted, modified or rearranged to best-fit a particular implementation without departing from the scope of the present invention. In general, like reference numbers indicate like elements.

Figure 1:
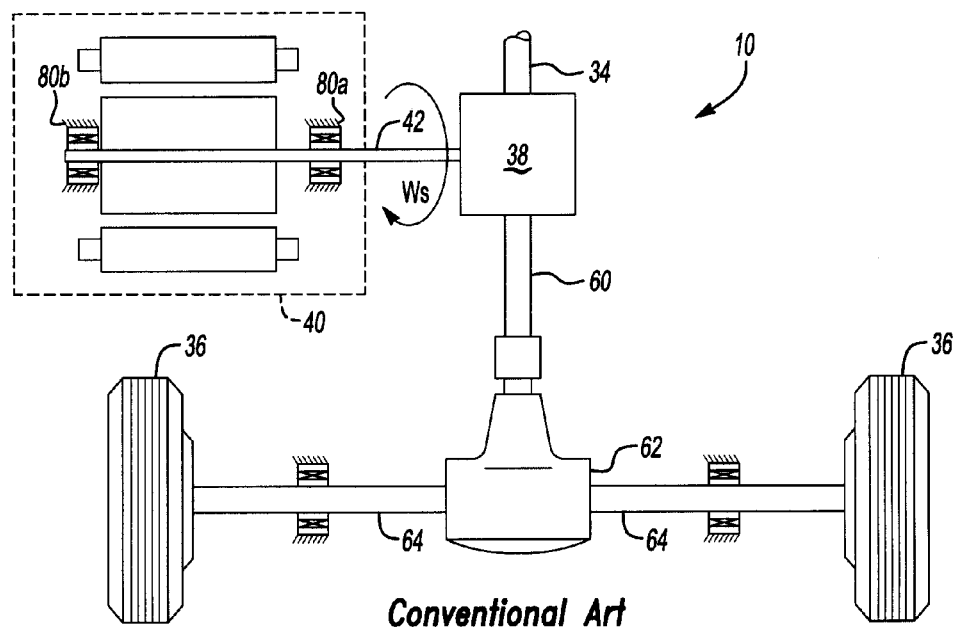
FIG. 1 is a cross-sectional schematic diagram of a conventional power transfer system.
Figure 2A:
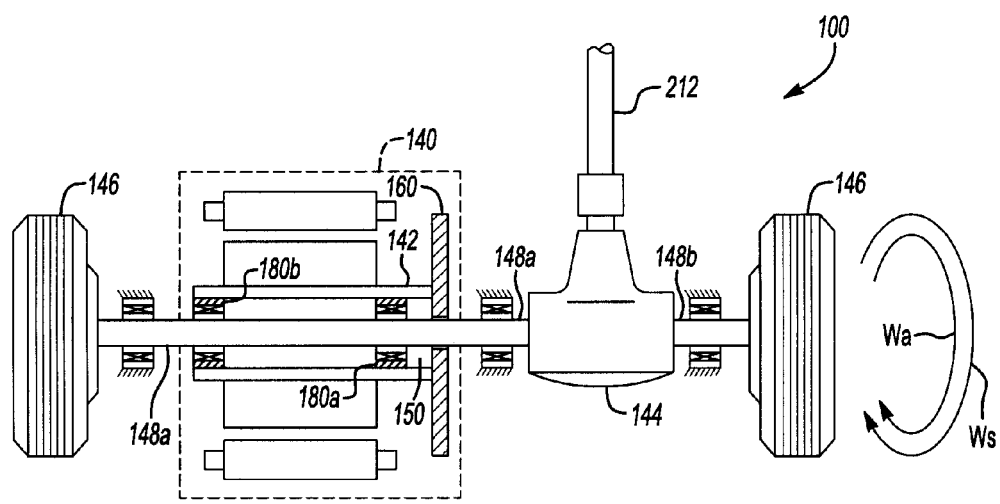
FIGS. 2(a-b) are cross-sectional schematic diagrams of power transfer systems corresponding to various embodiments of the present invention.

Referring to FIG. 2a, a cross-sectional schematic diagram is provided of a power transfer system 100 corresponding to at least one embodiment of the present invention. In general, the power transfer system 100 may include an electric machine (i.e., motor) 140 having a rotor shaft 142, a differential unit (i.e., differential) 144, one or more wheels 146, one or more half axles 148 (e.g., 148a and 148b) for coupling the differential unit 144 to the one or more wheels 146, and/or one or more bearing sets 180 (e.g., 180a and 180b). Furthermore, the system 100 may include a gear 160 coupled to the rotor shaft 142 for coupling the motor 140 to a gear set (an example of which is generally shown as element 210 in FIG. 3). The power transfer system 100 is generally configured to transfer power (e.g., torque) generated by the electric motor 140 to the one or more wheels 146 such that a corresponding vehicle (not shown) may be propelled.

The rotor shaft 142 of the motor 140 generally includes a bore 150 such that the rotor shaft 142 has an inner and outer surface. That is, the rotor shaft 142 generally includes a cavity (i.e., the bore) 150 extending (i.e., traversing) a length of the rotor shaft 142.

As illustrated in FIG. 2a, the motor 140 is generally aligned collinear with the differential unit 144 and the half axle 148a. Such alignment may involve passing the half axle 148a through the bore 150 such that the half axle 148a is proximate the inner surface of the rotor shaft 142.

Any appropriate number of bearing sets 180 may be configured and/or implemented to substantially center the half axle 148a within the bore 150 of the rotor shaft 142. In particular, a bearing set 180, such as the bearing set 180a, having an inner race proximate an outer surface of the half axle 148a and an outer race proximate the inner surface of the rotor shaft 142 may be implemented to substantially center the half axle 148a within the bore 150 of the rotor shaft 142.

In at least one embodiment, the outer race of the bearing set 180 may be fixedly coupled (i.e., grounded) to the inner surface of the rotor shaft 142 via (i.e., using) any appropriate mechanism to meet the design criteria of a particular application, such as one or more clips and/or welds.

Because the rotor shaft 142 generally circumscribes the bearing set 180 and the bearing set 180 generally circumscribes the half axle 148a (i.e., the bearing set 180 resides between the half axle 148a and the inner surface of the rotor shaft 142), the bearing set 180 generally rotates at a rotational speed substantially equal to Ws-Wa, where Ws is equal to the rotational speed of the rotor shaft 142 and Wa is equal to the rotational speed of the half axle 148a. Since the rotor shaft 142 and the half axle 148a generally rotate in the same direction, the bearing set 180 may be rated for a speed (e.g., the relative speed Ws-Wa) less than a no load speed and/or a predetermined maximum speed of the electric motor 140. It should be noted that the direction of rotation of Wa and Ws illustrated in FIG. 2a is exemplary and the direction of Wa and Ws may be reversed within the spirit and scope of the present invention.

Figure 2B:
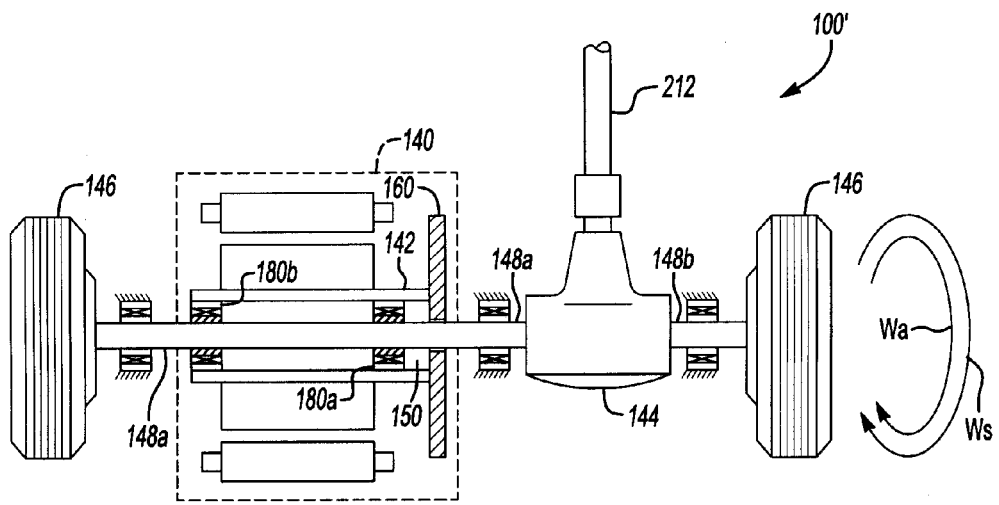

Referring, now, to FIG. 2b, a cross-sectional schematic diagram is provided of a power transfer system 100' corresponding to at least one other embodiment of the present invention. The system 100' may be implemented similarly to the system 100, with like reference numbers indicating like elements, with the exception that the inner race of the bearing set 180 (e.g., 180a, 180b, etc.), may be fixedly coupled (i.e., grounded) to the half axle 148a, instead of the outer race of the bearing set 180 being fixedly coupled to the rotor shaft 142. The inner race of the bearing set 180 may be fixedly coupled to the half axle 148a via any appropriate mechanism to meet the design criteria of a particular application, such as one or more clips and/or welds.

Figure 3:
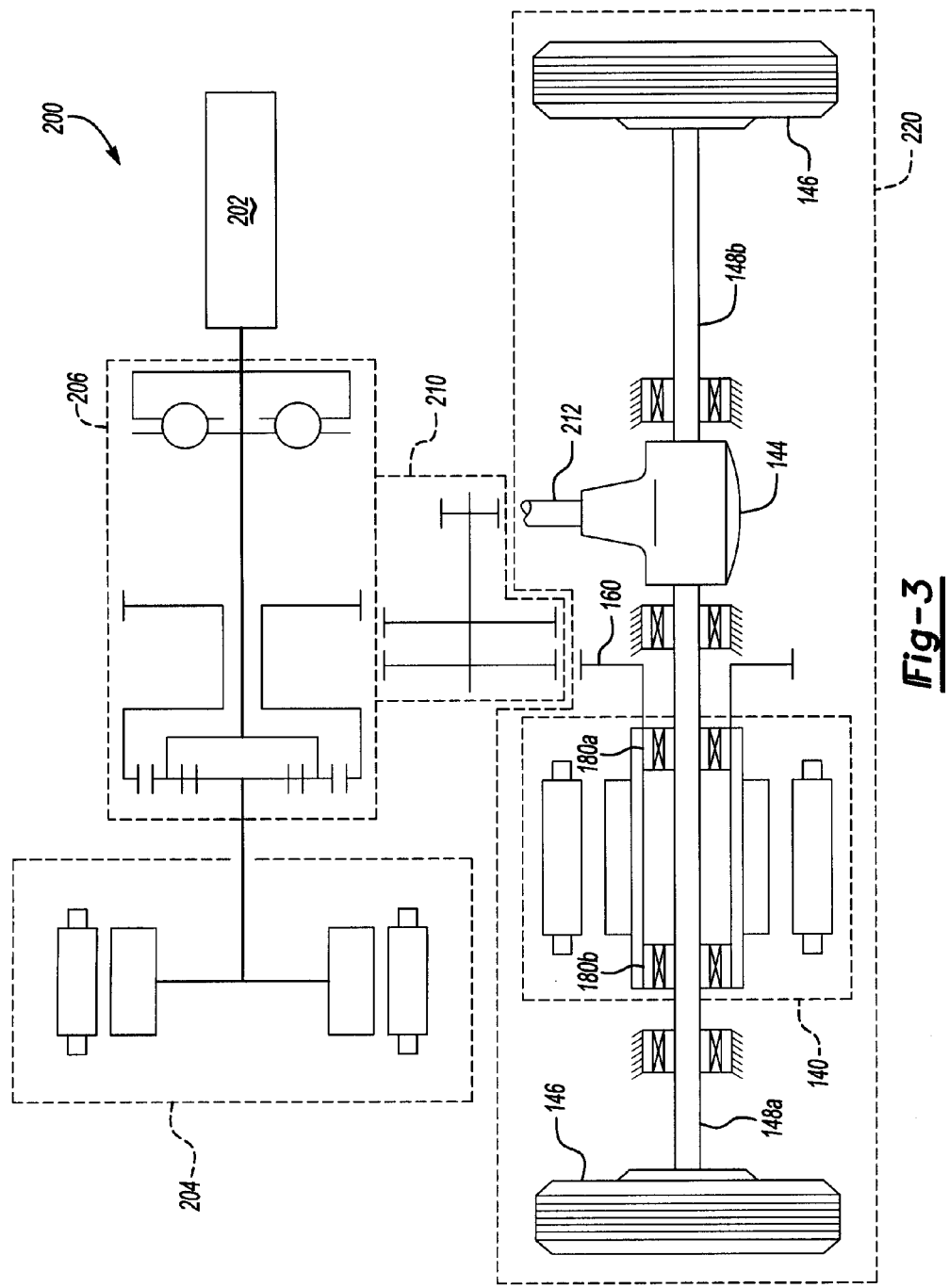
FIG. 3 is a schematic diagram of a vehicle including a power transfer system in accordance with an embodiment of the present invention.

Referring to FIG. 3, a schematic diagram is provided of a vehicle 200 including a power transfer system 220 in accordance with an embodiment of the present invention. As illustrated in FIG. 3, then, a power transfer system 220 in accordance with an embodiment of the present invention, such as the power transfer system 100 or 100' described previously in connection with FIGS. 2a and 2b respectively, may be implemented in connection with the vehicle 200. In addition to the power transfer unit 220, the vehicle 200 may include an engine 202 and a generator 204.

The engine 202 and the generator 204 may be connected through a power transfer unit 206 which may include, for example, a planetary gear set. Such a planetary gear set may, itself, include a ring gear, a carrier, planet gears, and/or a sun gear. Of course, other types of power transfer units 206, including other gear sets and transmissions, may be used to connect the engine 202 to the generator 204. Furthermore, in at least one embodiment, the generator 204 may be selectively used as a motor, outputting torque to the power transfer unit 206.

The power transfer unit 206 may be coupled to the gear set 210, which may, itself, be connected to vehicle drive wheels 146 through a shaft 212, a differential unit 144, and/or one or more half axles 148.

Although the vehicle 200 shown in FIG. 3, is a hybrid electric vehicle (i.e., HEV), it is understood that a power transfer system in accordance with an embodiment of the present invention may be implemented in connection with other types of vehicles having an electric motor 140. In addition, although the vehicle 200 shown in FIG. 3 is a parallel-series HEV, the present invention is not limited to HEV's having such a configuration.

Figure 4:
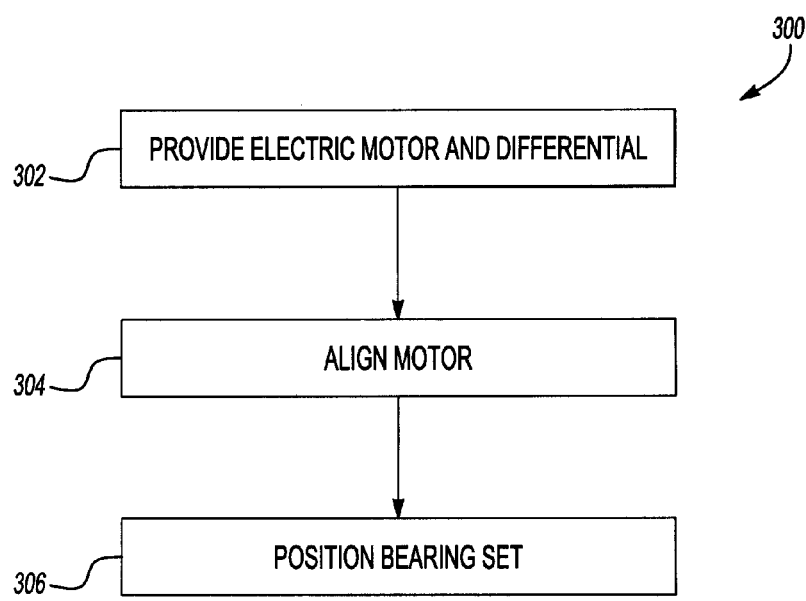
FIG. 4 is a flow diagram of a method for transferring power in a vehicle according to at least one embodiment of the present invention.

Referring to FIG. 4, a flow diagram of a method 300 for transferring power in a vehicle according to at least one embodiment of the present invention is shown. The method 300 may be advantageously implemented in connection with the systems 100, 100', and/or the vehicle 200 described previously in connection with FIGS. 2a, 2b and 3, respectively, and/or any appropriate system and/or vehicle to meet the design criteria of a particular application. The method 300 generally includes a plurality of blocks or steps that may be performed serially. As will be appreciated by one of ordinary skill in the art, the order of the blocks/steps shown in FIG. 4 is exemplary and the order of one or more block/step may be modified within the spirit and scope of the present invention. Additionally, the blocks/steps of the method 300 may be performed in at least one non-serial (or non-sequential) order, and one or more blocks/steps may be omitted to meet the design criteria of a particular application. Similarly, two or more of the blocks/steps of the method 300 may be performed in parallel.

Step 302 generally includes providing an electric motor (e.g., 140) configured to generate torque, and a differential unit (e.g., 144) coupled to a half axle (e.g., 148a). In general, the electric motor includes a rotor shaft (e.g., 142) having a bore (e.g., 150) such that the rotor shaft has an inner and outer surface. From step 302, the method 300 generally proceeds to step 304.

At step 304, the electric motor may be aligned (i.e., positioned) collinear with the differential unit and the half axle. In at least one embodiment, the step 304 may further include passing the half axle through the bore such that the half axle is proximate the inner surface of the rotor shaft. From step 304, the method 300 generally proceeds to step 306.

At step 306, an inner race of a bearing set (e.g., 180a) may be positioned adjacent an outer surface of the half axle. Similarly, an outer race of the bearing set may be positioned adjacent the inner surface of the rotor shaft. Accordingly, the bearing set may substantially center the half axle within the bore. In at least one embodiment, the outer race of the bearing set may be fixedly coupled to the inner surface of the rotor shaft via (i.e., using) any appropriate mechanism to meet the design criteria of a particular application, such as one or more clips and/or welds. In at least one other embodiment, the inner race of the bearing set may be fixedly coupled to the half axle via (i.e., using) any appropriate mechanism to meet the design criteria of a particular application, such as one or more clips and/or welds. In at least one embodiment, then, the bearing set may be configured to rotate at a rotational speed equal to Ws-Wa when the half axle is rotating at a rotational speed of Wa and the rotor shaft is rotating at a rotational speed of Ws. From step 306, the method 300 may terminate.

Accordingly, one or more embodiments of the present invention may provide a power transfer system and/or method wherein the rating of one or more power transfer bearing sets (e.g., 80a and/or 80b) may be reduced in comparison with the conventional system 10. Such a system and/or method may decrease the implementation and/or fabrication costs associated with a power transfer system and/or method.

While the best mode for carrying out the invention has been described in detail, those familiar with the art to which this invention relates will recognize various alternative designs and embodiments for practicing the invention as defined by the following claims.

What is claimed:

1. A vehicle power transfer system, the vehicle power transfer system comprising:
    a differential unit having an input coupled to a drive shaft and at least one output coupled to a half axle;
    an electric motor for supplying torque to the drive shaft and including a rotor shaft having a bore that the half axle passes through, wherein the electric motor is collinear with the differential unit and the half axle; and
    a gear set coupled to the rotor shaft that couples the electric motor to the drive shaft.

2. The vehicle power transfer system of claim 1 wherein the rotor shaft has an inner and outer surface defined by the bore.

3. The vehicle power transfer system of claim 2 wherein the half axle passes through the bore such that the half axle is proximate the inner surface of the rotor shaft.

4. The vehicle power transfer system of claim 3 further comprising a first bearing set configured to substantially center the half axle within the bore, the first bearing set having an inner and outer race, wherein the inner race of the first bearing set is proximate an outer surface of the half axle and the outer race of the first bearing set is proximate the inner surface of the rotor shaft.

5. The vehicle power transfer system of claim 4 wherein the outer race of the first bearing set is fixedly coupled to the inner surface of the rotor shaft.

6. The vehicle power transfer system of claim 5 wherein the outer race of the first bearing set is fixedly coupled to the inner surface of the rotor shaft via one or more clips.

7. The vehicle power transfer system of claim 5 wherein the outer race of the first bearing set is fixedly coupled to the inner surface of the rotor shaft via a weld.

8. The vehicle power transfer system of claim 4 wherein the inner race of the first bearing set is fixedly coupled to the half axle.

9. The vehicle power transfer system of claim 4 wherein the first bearing set is rated for a speed less than a no load speed of the electric motor.

10. The vehicle power transfer system of claim 4 wherein the first bearing set rotates at a first rotational speed substantially equal to Ws-Wa when the half axle is rotating at a second rotational speed of Wa and the rotor shaft is rotating at a third rotational speed of Ws.

11. The vehicle power transfer system of claim 4 further comprising a second bearing set spaced apart from the first bearing set and configured to substantially center the half axle within the bore, the second bearing set having an inner and outer race, wherein the inner race of the second bearing set is proximate an outer surface of the half axle and the outer race of the second bearing set is proximate the inner surface of the rotor shaft.

12. A method for transferring power in a vehicle, the method comprising:
   providing an electric motor configured to generate torque, and a differential unit having an input coupled to a drive shaft and at least one output coupled to a half axle, the electric motor including a rotor shaft having a bore;
   coupling the electric motor to a gear set through a gear coupled to the rotor shaft, the gear ser in turn being coupled to the drive shaft; and
   aligning the electric motor collinear with the differential unit and the half axle by passing the half axle through the bore.

13. The method of claim 12 wherein
   the rotor shaft has an inner and outer surface defined by the bore; and
   the half axle passes through the bore such that the half axle is proximate the inner surface of the rotor shaft.

14. The method of claim 13 further comprising positioning an inner race of a first bearing set adjacent an outer surface of the half axle and an outer race of the first bearing set adjacent the inner surface of the rotor shaft to substantially center the half axle within the bore.

15. The method of claim 14 further comprising fixedly coupling the outer race of the first bearing set to the inner surface of the rotor shaft.

16. The method of claim 14 further comprising fixedly coupling the outer race of the first bearing set to the inner surface of the rotor shaft using one or more clips.

17. The method of claim 14 further comprising fixedly coupling the outer race of the first bearing set to the inner surface of the rotor shaft using one or more welds.

18. The method of claim 14 further comprising fixedly coupling the inner race of the first bearing set to the half axle.

19. A vehicle comprising:
   a differential unit having an input coupled to a drive shaft and a pair of outputs coupled to a first half axle and a second half axle, each half axle coupled to couple to a wheel of the vehicle;
   an electric motor aligned collinearly with the differential unit and the first half axle, and including a rotor shaft having a bore such that the rotor shaft has an inner and outer surface, wherein the first half axle passes through the bore such that the first half axle is proximate the inner surface of the rotor shaft; and
   a gear coupled to the rotor shaft and gear set, the gear set in turn coupled to the drive shaft such that torque generated by the electric motor is applied to the drive shaft which, in turn, is applied to the first and second half axle through the differential unit to propel the vehicle.

20. The vehicle of claim 19 further comprising a first bearing set having an inner and outer race, wherein the inner race of the first bearing set is proximate an outer surface of the half axle and the outer race of the first bearing set is proximate the inner surface of the rotor shaft, wherein the first bearing set is configured to rotate at a first rotational speed equal to Ws-Wa when the half axle is rotating at a second rotational speed of Wa and the rotor shaft is rotating at a third rotational speed of Ws.

* * * * *

UNITED STATES PATENT AND TRADEMARK OFFICE
CERTIFICATE OF CORRECTION

PATENT NO.        : 7,624,828 B2                              Page 1 of 1
APPLICATION NO. : 11/381562
DATED             : December 1, 2009
INVENTOR(S)       : Shailesh Kozarekar It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 665 days.

Signed and Sealed this

Twenty-first Day of December, 2010

David J. Kappos
*Director of the United States Patent and Trademark Office*